United States Patent
Gagne et al.

(10) Patent No.: US 7,059,530 B2
(45) Date of Patent: Jun. 13, 2006

(54) HEATED PROTECTIVE WINDOW FOR AN OPTICAL SCANNING DEVICE

(75) Inventors: Andre Joseph Claude Gagne, Brampton (CA); Daniel Joseph Meringer, Burlington (CA)

(73) Assignee: Psion Teklogix,Inc., Mississauga (CA)

( * ) Notice: Subject to any disclaimer, the term of this patent is extended or adjusted under 35 U.S.C. 154(b) by 343 days.

(21) Appl. No.: 10/421,936

(22) Filed: Apr. 24, 2003

(65) Prior Publication Data

US 2004/0212861 A1    Oct. 28, 2004

(51) Int. Cl.
*G06K 7/10*    (2006.01)

(52) U.S. Cl. .......................... 235/462.45; 235/462.01; 235/472.01

(58) Field of Classification Search .............. 235/454, 235/462.01, 462.45, 472.01
See application file for complete search history.

(56) References Cited

U.S. PATENT DOCUMENTS

| | | | |
|---|---|---|---|
| 5,508,505 A * | 4/1996 | Walts et al. ........... | 235/462.46 |
| 5,729,003 A | 3/1998 | Briggs, III | |
| 6,321,990 B1 | 11/2001 | Giodano et al. | |
| 6,612,493 B1 * | 9/2003 | DeGiovine et al. .... | 235/462.01 |
| 2002/0060247 A1 * | 5/2002 | Krishnaswamy et al. ..................... | 235/472.01 |

* cited by examiner

*Primary Examiner*—Thien M. Le
*Assistant Examiner*—April Taylor
(74) *Attorney, Agent, or Firm*—Cahn & Samuels, LLP

(57) ABSTRACT

The invention relates to a window for an optical scanning device having a panel having a pair of oppositely directed light transmitting surfaces. A heater wire of a diameter less than the width of the smallest permissible indicia of a barcode is embedded between the first and second light transmitting surfaces. The heater wire being entirely contained within the perimeter of the optical scanning device window except for a length of both of its extremities.

23 Claims, 3 Drawing Sheets

HEATED PROTECTIVE WINDOW FOR AN OPTICAL SCANNING DEVICE

The present invention relates to a protective window for use on an optical scanning device.

BACKGROUND OF THE INVENTION

Various optical scanning devices, such as, for example, 2-D scanners or imaging scanners, have been developed for reading barcode symbols appearing on a label or the surface of an article. The barcode symbol itself is a coded pattern of indicia comprised of a series of bars of various widths spaced apart from one another to bound spaces of various widths. The bars and spaces have different light-reflecting characteristics and the barcode is read by projecting light, such as that from a laser beam, onto the barcode. The information content of the bar code is retrieved by monitoring the reflected beam and converting modulation in the reflected light in to a signal corresponding to the symbols.

Typically, the scanner has a body to house the components and a window to permit transmission of the beam from the laser and receive the reflected portion of the beam. The accuracy and range of the scanning device depends in part on the quality of the transmission through the window and any obstruction will lead to a degradation in performance.

Many optical scanning devices are mobile for use in warehousing and similar environments where a variety of environmental conditions can exist in a short span of time. For example, a hand-held barcode reader may be used to inventory goods located in a freezer. To avoid undue exposure of the operator to low temperatures, the frozen goods are withdrawn from the freezer and inventoried outside the freezer. When the hand-held barcode reader is taken in to a cold environment, the temperature of it's components drops below the dew point and, upon return to room temperature, condensation builds up on either or both sides of the barcode reader's window. The condensation completely or partially obscures the window and thus reduces the effectiveness of the barcode reader until the condensation dissipates. This leads to either inaccuracy of the reading or a reduction in the efficiency of the inventory taking.

Accordingly, it is an object of the present application to obviate or mitigate the above disadvantages.

SUMMARY OF THE INVENTION

The present invention seeks to provide a solution to the problem of having condensation building up on either or both sides of a window for an optical scanner when used in a condensing environment.

In accordance with one aspect of the present invention, there is provided a window assembly for an optical scanning device comprising a panel having a pair of oppositely directed light transmitting surfaces. A heater wire having a dimension measured in the plane of the panel less than the width of the smallest permissible indicia of a barcode is embedded between the first and second light transmitting surfaces. The heater wire is contained within the perimeter of the panel and has terminal portions for connection to a power source.

In accordance with a further aspect of the present invention there is provided an optical scanning device having a housing and a window assembly to transmit a beam from within said housing on to a barcode formed from a plurality of indicia, said window assembly comprising a pair of panels having a heater wire interposed therebetween in heat conducting relationship, a pair of terminals projecting from said window and connected electrically to a source of power within said housing and a switch operable to connect said power source to said heater wire.

Other applications and advantages of the present invention will be made clear by the following detailed description in which reference is made to the following appended drawings, in which:

DETAILED DESCRIPTION OF THE INVENTION

Figure 1:
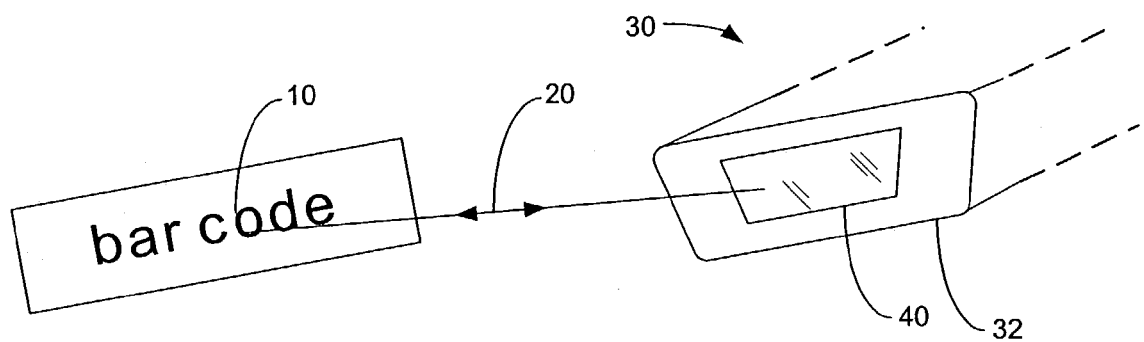
FIG. 1 is a perspective view of a hand-held barcode reader aimed at a barcode symbol.
Figure 2:
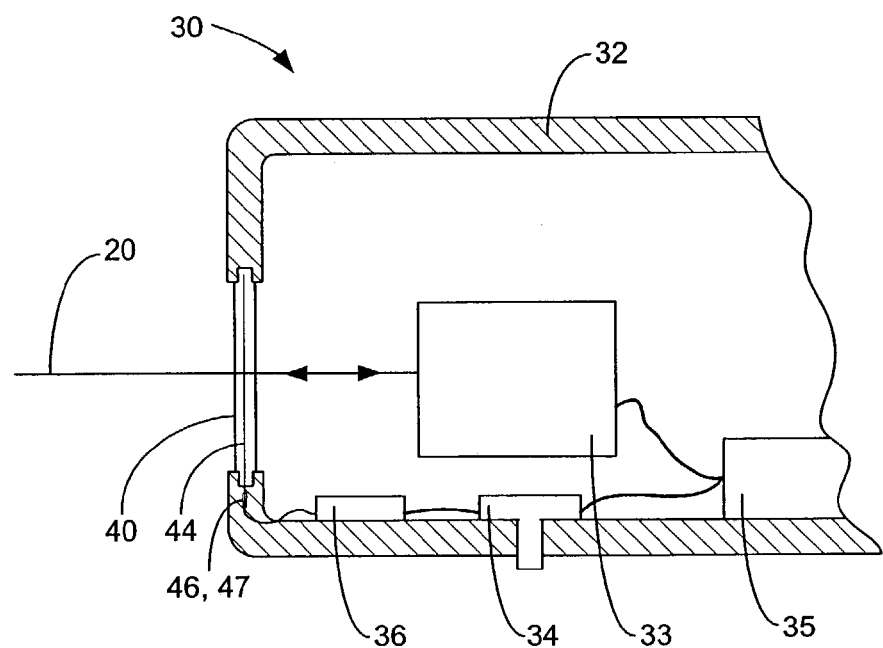
FIG. 2 is a sectional view of a portion of the hand-held barcode reader of FIG. 1.

Referring to the drawings, and particularly to FIGS. 1 and 2, there is shown an optical scanning device in the form of a hand-held barcode reader 30, including an external housing 32 having a window assembly 40 at one end. The housing 32 is arranged to be held in the palm of a user's hand and contains the components 33 for generating a laser beam 20 to be projected through the window assembly 40 and reading a reflected portion of the beam 20 received through the window assembly 40. A power source 35 is located within the housing 32 to supply electrical power to the components 33 of the barcode reader 30.

The barcode reader 30 is oriented in the direction of a barcode or other symbol 10 to be read. The outgoing beam 20 is generated in the barcode reader 30 by a laser diode or the like, is directed through barcode reader window assembly 40 to impinge upon the barcode 10. The range of the reader 30 may accommodate barcodes 10 that ordinarily are positioned of from just a few centimeters up to 18 or more meters from the barcode reader 30. The barcode 10 is formed from a concatenation of indicia of a predetermined minimum width to provide a binary modulation to the beam 20 as it is scanned and the reflected beam read to recover the code.

As mentioned previously, the hand-held barcode reader 30 may be used to inventory goods under conditions that may result in condensation developing on either or both sides of the barcode reader window 40. To avoid the formation of condensation, the temperature of the barcode reader window 40 is controlled. Accordingly, the barcode reader window 40 may either be kept at a temperature above the dew point, which prevents the build up of condensation on either of its sides or, alternatively, its temperature may be raised at any time, which clears the built up condensation. This is accomplished by incorporating a heating element within the window 40 that is connected to the power source 35 so as to provide a temperature adjustment mechanism.

Figure 3:
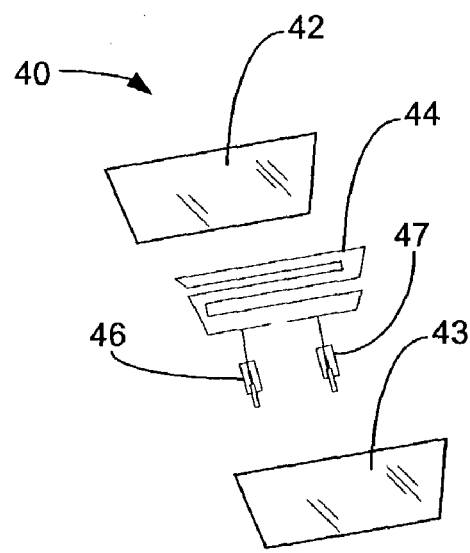
FIG. 3 is an exploded view of a window of the barcode reader of FIG. 1.
Figure 4:
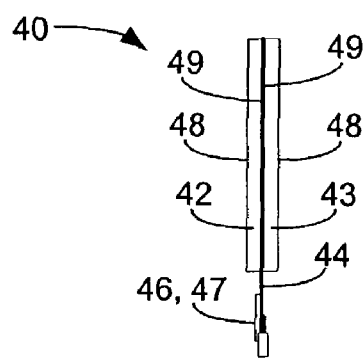
FIG. 4 is a side view of the barcode reader window of FIG. 3.
Figure 5:
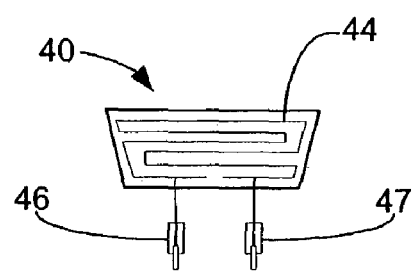
FIG. 5 is a front view of the barcode reader window of FIG. 3.

As best seen in FIGS. 3, 4 and 5 window assembly 40 comprises a first and second light transmitting elements 42 and 43 between which is sandwiched a heater wire 44 terminating into a pair of contacts 46 and 47. Each element has a pair of oppositely directed surfaces 48, 49 that present a pair of substantially planar surfaces to the beam 20.

In a particular embodiment, the barcode reader window 40 is made of cast red acrylic sheets with spectral transmission characteristics as described in Table 1 and is intended for use in laser barcode readers operating, preferably, in the 675 nm wavelength range. The overall thickness of the elements 42 and 43, in the particular embodiment, is 1.5 mm (0.059 inch)±0.15 mm (0.006 inch). It should be noted that barcode reader windows 40, with different characteristics, material and dimensions, may be substituted depending on, for example, the wavelength of the laser diode used.

TABLE 1

Spectral Transmission

| Wavelength | Transmission |
|---|---|
| 450 to 575 nm | 1% maximum |
| 576 to 600 nm | 10% maximum |
| 625 nm | 50% typical |
| 670 to 700 nm | 88% minimum |

In order to avoid the misinterpretation of the heater wire's 44 shadow as being part of the barcode 10, the heater wire 44 preferably has a dimension measured in the plane of the surfaces 48, 49 which is inferior to the precision of the optical reader. Typically, the smallest permissible width of an indicia composing a barcode is about 0.13 mm (0.005 inch), therefore the heater wire's 44 diameter should be inferior to 0.13 mm (0.005 inch) and preferably less than 50% of the width. It is preferred that the width is less than 20% and in a particular embodiment, the heater wire 44 has a diameter of 0.0229 mm (0.0009 inch), i.e. approximately 18% of the width of the indicia of the bar code, i.e. less than 20%. It should be noted that the size of the smallest bar composing a barcode varies depending on the type of reader used and thus the maximum acceptable diameter for the heater wire 44 will vary accordingly, i.e. be proportionately bigger or smaller.

In order to maintain the required performance of the window it is preferred that the heater wire 44 is arranged in a serpentine pattern with the runs of wire extending normal to axis of the indicia of the bar code and the reversals at the periphery of the window. Such an arrangement minimises the obstruction to the beam 20 during transmission and reflection. If the heater wire 44 is laid out perpendicular to the beam, i.e. parallel to the bars in the barcode 10, then the reader may view it as being part of the barcode 10. The presence of the heater wire 44 in the beam's 20 path, will inevitably cause some power loss which will result in scanning range loss. However by minimising the diameter and maintaining it less than the width of the smallest permissible indicia of the barcode, the losses are maintained in acceptable levels.

It should be noted that the heater wire may be of any electrically conductive material, it may also be any electrically conductive trace material forming a path from one terminal to the other. In this case, the width of the trace, i.e. the dimension in the plane of the surfaces, will conform to the parameters noted above.

In a particular embodiment, the heated barcode reader window 40 is assembled by laying out the heater wire 44 in the desired pattern onto a Pressure-Sensitive Adhesive (PSA) lined optically clear polyester sheet. The polyester sheet is of the same dimensions as the light transmitting panels 42 and 43, and the heater wire 44 is laid out on it so that its extremities protrude from the perimeter of the sheet. Preferably, the run of the heater wire 44 is transverse to the orientation of the bars of the barcode 10 and is of serpentine pattern with the reversals at the marginal portions of the barcode reader window 40. The extremities of the heater wire 44 terminate into contacts 46 and 47, such as, for example, gold plated contacts with 30 awg wire, which serve to connect the heater wire 44 to a power source and a control circuit. The polyester sheet is then applied onto one of the light transmitting panel's 42 surface. Following that, a PSA adhesive is applied onto the polyester sheet. Finally, the remaining light transmitting panel 43 is placed on top of the partial assembly such that the heater wire 44 and polyester sheet are sandwiched between both light transmitting panels 42 and 43. To complete the assembly process, the light transmitting panels 42 and 43 are compressed together at a pressure higher than the PSA's compression setting. All of this process is preferably done under vacuum in order to reduce adhesive distortion in the barcode reader window 40 caused by air entrapment. It is important to note that the surfaces 48, 49 of the light transmitting panels 42 and 43 need to be parallel to each other to ensure proper reflection and refraction angles. In an alternate embodiment, the heater wire 44 may be embedded within a light transmitting panel and/or may be laid out in other configurations such as, for example, circular or sinusoidal patterns.

After mounting the window assembly 40 in the housing 32, the contacts 46, 47 are connected to the power source 35 through a suitable switching device 34 to control the power to the heater wire 44. The heater wire 44 of the window assembly 40 may be activated manually by the user through a switch 34 accessible to the user to remove any condensation that may have built up. Preferably however the heater wire 44 is connected, using contacts 46 and 47, to a thermostat 36 such as, for example, the LM56 Dual Output Low Power Thermostat by National Semiconductor, for keeping the barcode reader window 40 above a minimum temperature, preferably above the dew point. The thermostat 36 is mounted within the housing 32 preferably on an exterior surface so that it is responsive to external temperature fluctuations. Alternately, the thermostat 36 may use, for example, a RTD (Resistance Temperature Device) temperature sensor or a thermocouple based sensor. Thus during use the heater wire 44 is activated when the external temperature is below the setting of the thermostat 36. The current supplied to the wire 44 ensures that the window 40 is maintained at an elevated temperature so that upon the barcode reader 30 being moved to a condensing environment, the window 40 is above the dew point and condensation does not form.

Figure 6:
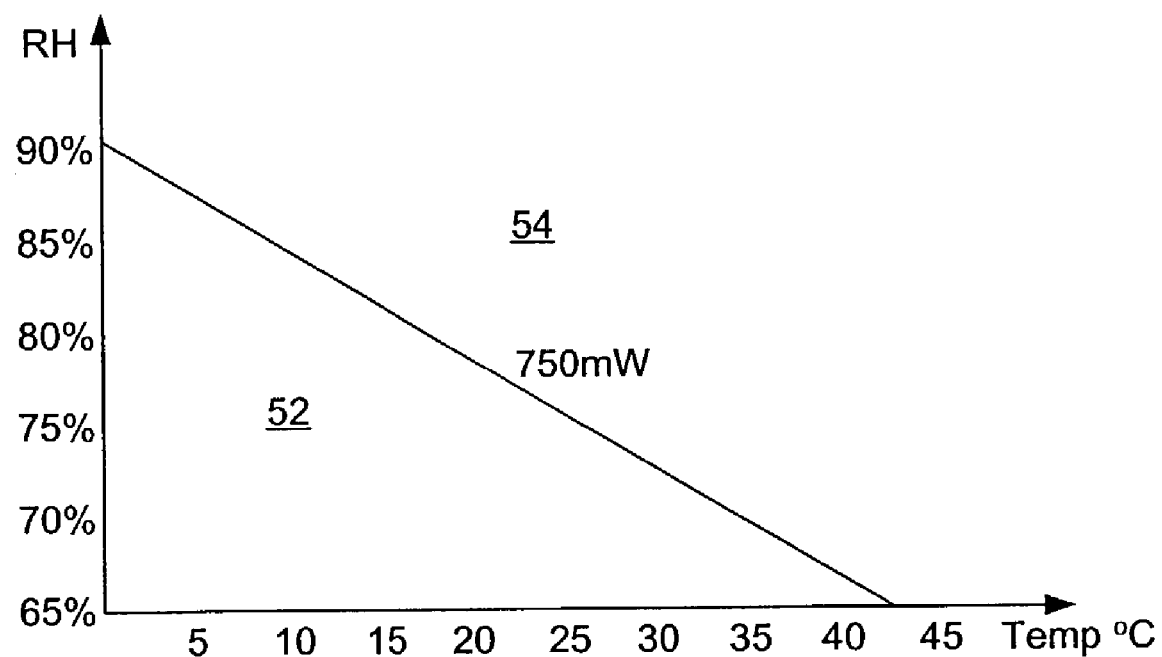
FIG. 6 is a histogram of the appearance of condensation as a function of the relative humidity level and temperature for a particular embodiment.

In the particular embodiment, the size of the heated barcode reader window 40, which is made of cast red acrylic sheets, is approximately 34.9 mm (1.374 inch) by 16.1 mm (0.634 inch) and has a power consumption above 750 mW. It should be noted that the power consumption of the particular embodiment is based on a window made of cast red acrylic sheets, other material may be substituted, such as glass or pyrex©, in which case the power consumption requirement will vary according to the thermal characteristics of the material used. FIG. 6 illustrates the histogram, for the particular embodiment, of the appearance of condensation impairing the hand-held barcode reader's 30 operation as a function of the relative humidity (RH) and ambient temperature when the barcode reader 30 is taken from an environment having a temperature of −30° C. The numeral 52 represents the region where there is no condensation or where the condensation is light enough so as not to interfere with the hand-held barcode reader's 40 operation, while numeral 54 indicates the region where the condensation renders the barcode reader 30 non-functional.

Other embodiments having windows of different size and/or material and power requirements are possible. Similarly, the heater wire 44 may be embedded within the window assembly 40 by techniques other than lamination, such as being cast in situ so as to be below the surfaces 48, 49.

Although the present invention has been described by way of a particular embodiment thereof, it should be noted that modifications may be applied to the present particular embodiment without departing from the scope of the present invention and remain within the scope of the appended claims.

What is claimed is:

1. A window assembly for an optical scanner comprising:
   a. a first light transmitting panel having a pair of oppositely directed planar surfaces parallel to one another to receive and transmit a scanning beam; and
   b. a heater wire having a dimension measured in a plane of said first light transmitting panel parallel to said surfaces, less than a width of a minimum permissible indicia in a barcode and embedded between said parallel surfaces of said first light transmitting panel, said heater wire being contained within a perimeter of said first light transmitting panel and having terminal portions for connection to a power source.

2. A window assembly according to claim 1, wherein said first light transmitting panel is formed from a pair of optically transmissive elements juxtaposed with one another and each having a pair of oppositely directed planar parallel faces and said heater wire is located between a pair of said faces of said optically transmissive elements.

3. A window assembly as defined in claim 2, wherein said optically transmissive elements are cast red acrylic sheets.

4. A window assembly as defined in claim 1, wherein said optical scanner window assembly has a spectral transmission of 1% maximum for wavelengths between 450 nm and 575 nm, 10% maximum for wavelengths between 576 nm and 600 nm, 50% for a wavelength of 625 nm and 88% minimum for wavelengths between 670 nm and 700 nm.

5. A window assembly as defined in claim 1, wherein said dimension of said heater wire is less than 0.13 mm (0.005 inch).

6. A window assembly as defined in claim 1, wherein said heater wire is arranged in a serpentine pattern in said first light transmitting panel.

7. A window assembly according to claim 1, wherein said dimension of said heater wire is less than 50% of a minimum permissible width of an indicia in a barcode.

8. A window assembly according to claim 1, wherein said dimension of said heater wire is less than 20% of a minimum permissible width of an indicia of a barcode.

9. A window assembly as defined in claim 1, wherein the heater wire is laid out in a serpentine pattern with reversals of said heater wire at the marginal portions of said first light transmitting panel.

10. A window assembly according to claim 1, wherein said terminal portions extend beyond said perimeter of said first light transmitting panel.

11. An optical scanning device having
a housing and
a window assembly to transmit a beam between an interior of said housing and a barcode formed from a plurality of indicia, said window comprising
   a panel having a pair of oppositely directed planar surfaces parallel to one another,
   a heater wire interposed between said parallel surfaces in heat conducting relationship and terminating in a pair of terminals connected electrically to a source of power within said housing, said heater wire having a dimension measured in the plane of the panel less then the width in a barcode, and
   a switch operable to connect said power source to said heater wire.

12. An optical scanning device according to claim 11, wherein said switch comprises a thermostat connected to said heater wire for maintaining said optical scanning device above a predetermined value.

13. An optical scanning device according to claim 12, wherein said thermostat is located on an exterior surface of said housing.

14. An optical scanning device according to claim 11, wherein said heater wire is arranged in a serpentine pattern extending generally transverse to indicia of said bar code.

15. An optical scanning device according to claim 14, wherein said heater wire has a dimension measured in a plane of said panel parallel to said planar surfaces less than the smallest permissible width of indicia of said barcode.

16. An optical scanning device according to claim 14, wherein said heater wire has a dimension less than 50% of the smallest permissible width of said indicia.

17. An optical scanning device according to claim 14, wherein said heater wire has a dimension less than 20% of the smallest permissible width of said indicia.

18. An optical scanning device according to claim 14, wherein said indicia has a smallest permissible width of 0.13 mm (0.005 inch) and said heater wire has a diameter in the order of 0.0229 mm (0.0009 inch).

19. An optical scanning device according to claim 11, wherein said panel is formed from a pair of optical elements arranged in juxtaposition and said heater wire is located between said surfaces.

20. An optical scanning device according to claim 19, wherein said terminal portions extend beyond said perimeter for connection to said power source.

21. A method of forming a window for a scanner assembly comprising:
   interposing a heater wire between a pair of optically transmissive elements, each having a pair of oppositely directed planar faces securing the heater wire, and
   applying a compressive force to the optically transmissive elements to compress the heater wire whilst maintaining the faces parallel.

22. The method of claim 21, wherein the heater wire is mounted on a flexible sheet and the sheet is secured by pressure sensitive adhesive.

23. The method of claim 22 further comprising applying the compressive force under vacuum to exclude air from between the optically transmissive elements.

* * * * *